(12) United States Patent
Zelig et al.

(10) Patent No.: US 7,283,465 B2
(45) Date of Patent: Oct. 16, 2007

(54) HIERARCHICAL VIRTUAL PRIVATE LAN SERVICE PROTECTION SCHEME

(75) Inventors: David Zelig, Givataim (IL); Leon Bruckman, Petah Tikva (IL); Yoav Kotser, Givataim (IL)

(73) Assignee: Corrigent Systems Ltd., Tel Aviv (IL)

( * ) Notice: Subject to any disclaimer, the term of this patent is extended or adjusted under 35 U.S.C. 154(b) by 634 days.

(21) Appl. No.: 10/337,382

(22) Filed: Jan. 7, 2003

(65) Prior Publication Data

US 2004/0133619 A1   Jul. 8, 2004

(51) Int. Cl.
*G06F 11/00* (2006.01)

(52) U.S. Cl. ............... 370/219; 370/217; 370/218; 714/4; 709/238; 709/239

(58) Field of Classification Search ............. 714/4; 370/216, 217, 219, 220, 225; 709/238, 239
See application file for complete search history.

(56) References Cited

U.S. PATENT DOCUMENTS

| | | | |
|---|---|---|---|
| 5,321,393 A | 6/1994 | Carlton et al. | |
| 5,473,599 A * | 12/1995 | Li et al. ............ | 370/219 |
| 5,596,569 A | 1/1997 | Madonna et al. | |
| 5,638,358 A | 6/1997 | Hagi | |
| 5,983,360 A | 11/1999 | Ugajin | |
| 6,032,194 A | 2/2000 | Gai et al. | |
| 6,205,488 B1 | 3/2001 | Casey et al. | |
| 6,275,493 B1 | 8/2001 | Morris et al. | |
| 6,304,575 B1 | 10/2001 | Carroll et al. | |
| 6,330,229 B1 | 12/2001 | Jain et al. | |
| 6,339,595 B1 | 1/2002 | Rekhter et al. | |
| 6,359,858 B1 | 3/2002 | Smith et al. | |
| 6,446,131 B1 | 9/2002 | Khansari et al. | |
| 6,466,985 B1 | 10/2002 | Goyal et al. | |
| 6,604,136 B1 | 8/2003 | Chang et al. | |
| 6,628,624 B1 | 9/2003 | Mahajan et al. | |
| 6,636,478 B1 | 10/2003 | Sensel et al. | |
| 6,724,880 B1 | 4/2004 | Lynch | |
| 6,760,775 B1 | 7/2004 | Anerousis et al. | |
| 6,765,921 B1 | 7/2004 | Stacey et al. | |

(Continued)

OTHER PUBLICATIONS

"Star Network" "Star Topology" "Mesh Network". Microsoft Computer Dictionary (Fifth Edition).2002. Microsoft Press.*

(Continued)

*Primary Examiner*—Robert Beausoliel
*Assistant Examiner*—Matthew Urick
(74) *Attorney, Agent, or Firm*—Oblon, Spivak, McClelland, Maier & Neustadt, P.C.

(57) ABSTRACT

A data communication network includes a plurality of primary virtual bridges, interconnected by primary virtual connections so as to transmit and receive data packets over the network to and from edge devices connected thereto. One or more backup virtual bridges, each associated with at least one of the primary virtual bridges, are connected by at least one secondary virtual connection to at least another one of the primary virtual bridges, so that upon a failure of one of the primary virtual bridges with which it is associated, the backup virtual bridge transmits and receives the data packets over the network via the at least one secondary virtual connection in place of the at least one of the primary virtual bridges.

30 Claims, 3 Drawing Sheets

U.S. PATENT DOCUMENTS

| | | | |
|---|---|---|---|
| 6,778,496 | B1 | 8/2004 | Meempat et al. |
| 6,879,559 | B1 | 4/2005 | Blackmon et al. |
| 6,879,594 | B1 | 4/2005 | Lee et al. |
| 6,886,043 | B1 | 4/2005 | Mauger et al. |
| 2001/0022786 | A1 | 9/2001 | King et al. |
| 2002/0110087 | A1 | 8/2002 | Zelig et al. |
| 2002/0176450 | A1 | 11/2002 | Kong et al. |
| 2002/0179720 | A1 | 12/2002 | Liva et al. |
| 2003/0037162 | A1 | 2/2003 | Kotser |
| 2003/0088698 | A1* | 5/2003 | Singh et al. ............ 709/239 |
| 2003/0147344 | A1* | 8/2003 | Stewart et al. ........... 370/216 |
| 2003/0196135 | A1 | 10/2003 | Gottlieb |
| 2004/0078620 | A1 | 4/2004 | Harel et al. |
| 2004/0133619 | A1 | 7/2004 | Zelig et al. |
| 2004/0202171 | A1 | 10/2004 | Hama |

OTHER PUBLICATIONS

Null, Linda. The Essentials of Computer Organization and Architecture2003. Jones and Barlett Computer Science. p. 536.*

Beyond Basic IP (Cisco Systems—Dated Aug. 2002—URL: http://www.cisco.com/warp/public/779/servpro/promotions/bbip/volume_03_issue07.html).*

Null, Linda. The Essentials of Computer Organization and Architecture2003. Jones and Barlett Computer Science. p. 425-427, 535, 536, 541, 542.*

J. Lau, et al., IETF draft-ietf-l2tpext-l2tp-base-04.txt, pp. 1-71, "Layer Two Tunneling Protocol (Version 3) "L2TPV3"", Nov. 2002.

J. Lau, et al., IETF draft-ieft-l2tpext-l2tp-base-06.txt, pp. 1-66, "Layer Two Tunneling Protocol (Version 3)", Jan. 2003.

S. Bryant, et al., IETF draft-ieft-pwe3-protocol-layer-00.txt, pp. 1-28, "Protocol Layerng in PWE3", May 2002.

M. Lasserre, et al., IEFT draft-lasserre-vkompella-ppvpn-vpls-02.txt, pp. 1-23, "Virtual Private LAN Services Over MPLS", Jun. 2002.

M. Lasserre, et al., IEFT draft-lasserre-vkompella-ppvpn-vpls-03.txt, pp. 1-23, "Virtual Private LAN Services Over MPLS", Jan. 2003.

A. Sodder, et al., IEFT draft-sodder-ppvpn-vhls-01.txt, pp. 1-13, "Virtual Heirarchical LAN Services", Nov. 2002.

Rosen, et al., Request for Comments (RFC) 3031 of the Internet Engineering Task Force, pp. 1-86, "Multiprotocol Label Switching Architecture", Jan. 2001.

L. Martini, et al., IEFT draft-martini-l2circuit-encap-mpls-01, pp. 1-17, "Encapsulation Methods for Transport of Layer 2 Frames Over MPLS", Feb. 2001.

L. Martini, et al., IEFT draft-martini-l2circuit-trans-mpls-05, pp. 1-15, "Transport of Layer 2 Frames Over MPLS", Feb. 2001.

ANSI/IEEE Standard 802.1D, pp. 37-50, "Information Technology—Telecommunications and Information Exchange Between Systems—Local Metropolitan Area Networks-Common Specifications-Part 3: Media Access Control (MAC) Bridges", 1998.

ISO/IEC Standard 7498-1, pp. 1-59, "Information Technology—Open Systems Interconnection—Basic Reference Model: The Basic Model", 1994.

* cited by examiner

HIERARCHICAL VIRTUAL PRIVATE LAN SERVICE PROTECTION SCHEME

FIELD OF THE INVENTION

The present invention relates generally to communication networks, and specifically to methods and systems for providing virtual private LAN services (VPLS).

BACKGROUND OF THE INVENTION

Local Area Networks (LANs) connect computing systems together. LANs of all types can be connected together using Media Access Control (MAC) bridges, as set forth in the "IEEE Standard for Information Technology, Telecommunications and Information Exchange between Systems, Local and Metropolitan Area Networks, Common Specifications, Part 3: Media Access Control (MAC) Bridges," published as ANSI/IEEE Standard 802.1D (1998), which is incorporated herein by reference. The 802.1D standard is available at standards.ieee.org/getieee802/download/802.1D-1998.pdf.

Each computing system connects to a LAN through a MAC device. MAC bridges that implement the 802.1D standard allow MAC devices attached to physically separated LANs to appear to each other as if they were attached to a single LAN. A MAC bridge functions within the Logical Link Control (LLC) sublayer of the Network Layer defined in ISO/IEC standard 7498-1:1994, entitled "Information Processing Systems-Open Systems Interconnection-Basic Reference Model-Part 1: The Basic Model" (available from the American National Standards Institute, New York, N.Y.), which is incorporated herein by reference. The bridge includes two or more MAC devices that interconnect the bridge ports to respective LANs.

MAC bridges maintain a database to map destination MAC addresses of the packets they receive to bridge ports. The bridge builds the database by means of a learning process, in which it associates the source MAC address of each incoming packet with the port on which the packet was received. When the bridge receives an incoming packet whose destination address is not located in the database, it broadcasts the packet through all its available ports, except the one through which the packet arrived. Other MAC bridges that do not recognize the destination address will further broadcast the packet. Through the broadcast mechanism, the packet will eventually traverse all interconnected bridges, and will ultimately reach its destination. A similar broadcast operation is performed independently for having a destination MAC address of a broadcast or multicast group, although the multicast scope may be reduced if the bridge is aware (by use of special protocols) of the physical locations of the target addresses in each multicast group. The operation of broadcast or multicast of a packet is referred to (independently of the reason) as a flooding process.

Multiprotocol Label Switching (MPLS) is gaining popularity as a method for efficient transportation of data packets over connectionless networks, such as Internet Protocol (IP) networks. MPLS is described in detail by Rosen et al., in Request for Comments (RFC) 3031 of the Internet Engineering Task Force (IETF), entitled "Multiprotocol Label Switching Architecture" (Jan., 2001), which is incorporated herein by reference. This RFC, as well as other IETF RFCs and drafts cited hereinbelow, is available at www.ietf.org. In conventional IP routing, each router along the path of a packet sent through the network analyzes the packet header and independently chooses the next hop for the packet by running a routing algorithm. In MPLS, however, each packet is assigned to a Forwarding Equivalence Class (FEC) when it enters the network, depending on its destination address. The packet receives a short, fixed-length label identifying the FEC to which it belongs. All packets in a given FEC are passed through the network over the same path by label-switching routers (LSRs). Unlike IP routers, LSRs simply use the packet label as an index to a look-up table, which specifies the next hop on the path for each FEC and the label that the LSR should attach to the packet for the next hop.

Since the flow of packets along a label-switched path (LSP) under MPLS is completely specified by the label applied at the ingress node of the path, a LSP can be treated as a tunnel through the network. Such tunnels are particularly useful in network traffic engineering, as well as communication security. MPLS tunnels are established by "binding" a particular label, assigned at the ingress node to the network, to a particular FEC.

One of the most promising uses of MPLS tunnels is in transporting layer-2 packets, such as Ethernet frames or ATM cells, over high-speed, high-performance packet networks. Methods for this purpose are described, for example, by Martini et al., in "Encapsulation Methods for Transport of Ethernet Frames Over IP/MPLS Networks" (IETF draft-ietf-ethernet-encap-00.txt, August, 2002), which is incorporated herein by reference. This draft defines mechanisms for encapsulating Ethernet traffic for transportation over IP networks using MPLS or other tunneling methods, such as Generic Routing Encapsulation (GRE), as are known in the art. L2TPv3, described by Townsley et al in "Layer Two Tunneling Protocol (Version 3) 'L2TPv3'" (IETF draft-ietf-12tpext-12tp-base-04.txt, Nov., 2002), which is incorporated herein by reference, is another technique for tunneling layer-2 packets over IP networks, which can be used, inter alia, to carry Ethernet packets within a provider network. The term "layer 2" refers to the second layer in the protocol stack defined by the well-known Open Systems Interface (OSI) model, also known as the logical link, data link, or MAC, layer.

According to the model proposed by Martini et al., native Ethernet LANs are connected to the IP network by provider edge (PE) devices, which are linked one to another by tunnels through the IP network. The sending (ingress) PE device receives Ethernet frames from a customer edge (CE) device on the source LAN. It encapsulates the frames in packets with the label stack required for transmitting the packets through the appropriate tunnel to the receiving (egress) PE device.

The label structure includes a "PW demultiplexer" label (or virtual connection-VC label), which is used by the egress PE device to recognize the context of the packet if multiple connections share the same tunnel. Based on the PW demultiplexer label, the PE device de-encapsulates the frame and, optionally, adds a VLAN tag for transmission on the target LAN to the destination CE device. Details of the PW demultiplexer structure are described by Bryant et al. in an IETF draft entitled "Protocol Layering in PWE3" (IETF draft-ietf-pwe3-protocol-layer-00.txt, May, 2002), which is incorporated herein by reference. Martini et al. specify label distribution procedures for binding the VC label to the desired service in the case of MPLS transport in a further draft entitled "Transport of Layer 2 Frames over MPLS" (IETF draft-ietf-pwe3-control-protocol-01.txt, November, 2002), which is also incorporated herein by reference.

As a result of this encapsulation and associated processing functions, the IP network emulates Ethernet trunking behavior and can thus be treated as an Ethernet "pseudo wire"

(PW). In other words, from the point of view of native Ethernet LANs that are connected to tunnels through the IP network, each PW is a virtual Ethernet point-to-point connection, emulating a physical connection between two Ethernet ports.

Taking this functionality a step further, Lasserre et al. describe a method to create a virtual private LAN service (VPLS) using a MPLS network in "Virtual Private LAN Services over MPLS" (IETF draft-lasserre-vkompella-ppvpn-vpls-02.txt, June, 2002), which is incorporated herein by reference. Although this reference is limited in scope to MPLS tunneling, the PW connection between the nodes can more generally be implemented using any available PW protocol, such as GRE or L2TPv3. A VPLS (also known as a transparent LAN service—TLS) provides bridge-like functionality between multiple sites over a large network. Users connect to the VPLS via regular node interfaces, and PWs between the nodes to which the users are connected form the VPLS entity itself. Every node in a VPLS acts as a virtual bridge. A virtual bridge node has "virtual ports," which are the endpoints of PWs that are part of the VPLS. The interfaces to which the users are actually connected are physical ports at the network edges. Both virtual and real interfaces are treated identically from the point of view of frame forwarding and address learning. A single provider node can participate in multiple VPLS instances, each belonging to a different user.

The VPLS network topology is completely specified by the PW connections. When the PW connections are MPLS tunnels, the VPLS depends on the MPLS protocol to actually transfer the packets through the network. Since MPLS networks supply an alternative, virtual implementation of layer-2 network communications, VPLS can be thought of as parallel to conventional virtual bridged local area networks, as specified in the IEEE 802.1Q standard. From the perspective of the end-user, the VPLS network is transparent. The user is provided with the illusion that the provider network is a single LAN domain. User nodes on different physical LANs can thus be joined together through VPLS connections to define a virtual private network (VPN), which appears to the users to be a single Ethernet LAN.

VPLS networks are still in the development stage, and there are as yet no clear standards for loop prevention in such networks. One possible solution to avoiding loops in VPLS topologies is to configure the VPLS network as a full mesh of tunnels, as specified by Lasserre et al. in the above-mentioned draft. In a full mesh, each PE is directly connected to every other PE in the same VPN by a single PW. To avoid loops in the VPN, Lasserre et al. require that all PEs support a "split horizon" scheme, meaning that a PE must not forward traffic from one PW to another, although it may (and should) forward traffic from one physical port to another and between physical ports and the PWs. Considering the scope of flooding generally, a packet to be flooded coming from a PW will never be copied to another PW on the full mesh side, but is flooded to all Ethernet ports on the same VPN. An Ethernet packet to be flooded arriving from a physical port is copied to all other physical ports and to all the full mesh PWs of the same VPN. This split behavior differs from the traditional model of 802.1D bridges.

"Hierarchical VPLS" is an extension to the VPLS model, which is also described by Lasserre et al. in the above-mentioned draft. In hierarchical VPLS, some or all of the physical interfaces on one side of the split horizon can be replaced by point-to-point PWs, which act as logical extensions of physical ports of remote nodes. In this case, there are both full mesh PWs and point-to-point PWs (and possibly even physical ports) associated with the same VPN. Nodes with only point-to-point PWs are considered to be on the "access side" of the network, and are referred to as "edge nodes." Nodes with full mesh PWs are considered to be in the "core side" of the network, and are referred to as "core nodes." The scope of forwarding and flooding is the same as described above for full mesh PWs and physical ports.

In the Hierarchical VPLS model, protection against some failures is achieved by backup point-to-point PWs between each edge node and an additional core node (also referred to as "redundant" or "protection" PWs). This backup PW connection is in addition to the "standard" PW connection already existing between the edge node and another core node. Thus, if a VC between an edge node and a core node fails, a backup "protection path" through another core node can be used to provide access between the edge node and the rest of the network.

Hierarchical VPLS has the advantages of reducing significantly both the number of connections in the network and the number of times a packet needs to replicated in the learning process, when compared with a standard full mesh topology. The failure protection scheme suggested by Lasserre et al., however, can result in a long period of traffic outage if a virtual connection fails between an edge node and a core node, or if a core node fails. In most cases, initiation of failure protection depends on MAC address aging and learning schemes, which are inherently slow. Lasserre et al. in the above-mentioned draft make no provisions for handling multiple failures at once. In addition, the need to handle both standard connections (to edge nodes and other core nodes) and backup protection connections (to edge nodes) complicates the design of the VPLS core nodes and of the network as a whole.

An alternative hierarchical solution for VPLS connectivity is defined by Sodder et al. in an IETF draft entitled "Virtual Hierarchical LAN Services" (IETF draft-sodder-ppvpn-vhls-01.txt, November, 2002) which is incorporated herein by reference. While Sodder's PW encapsulation is different from the format defined in the above-mentioned references, the system topology (called VHLS in the Sodder draft) is very similar to that described above. MAC learning by edge nodes in Sodder's system is carried out hierarchically from the MAC point of view (MAC in MAC encapsulation). In terms of the operation of core devices and network topology, however, VHLS is substantially the same as the VPLS described by Lasserre et al.

SUMMARY OF THE INVENTION

The present invention seeks to provide improved mechanisms for protection from failure in virtual private networks (VPNs), particularly Ethernet VPNs. Although the embodiments of the present invention that are described hereinbelow are based on VPLS networks, the principles of the present invention are similarly applicable to other types of transparent LAN-over-IP services, using other types of virtual bridge devices.

In preferred embodiments of the present invention, a VPN comprises primary core nodes, as in a conventional hierarchical VPLS network, along with one or more standby core nodes. Each standby core node has the same topological image in the network (i.e., the same connections) as a corresponding primary core node which it protects. Therefore, if the primary core node fails, the remaining nodes in the network simply redirect all connections from the failed primary core node to the corresponding standby core node. Since the standby core node has the same topology as the failed primary core node, the remaining nodes in the network do not need to re-learn MAC table addresses, and are thus able to recover quickly from the failure. In addition, since there is no topology change, there is no need to clear the MAC tables, so that packet flooding is reduced significantly.

Furthermore, a network designed in accordance with the present invention can handle multiple simultaneous node failures, as long as at least one core node from each pair of primary and standby core nodes does not fail.

There is therefore provided, in accordance with a preferred embodiment of the present invention, a data communication network, including:

a plurality of primary virtual bridges, interconnected by primary virtual connections so as to transmit and receive data packets over the network to and from edge devices connected thereto; and one or more backup virtual bridges, each such backup virtual bridge being associated with at least one of the primary virtual bridges and connected by at least one secondary virtual connection to at least another one of the primary virtual bridges, so that upon a failure of one of the primary virtual bridges with which it is associated, the backup virtual bridge transmits and receives the data packets over the network via the at least one secondary virtual connection in place of the at least one of the primary virtual bridges.

Preferably, the primary and backup virtual bridges are adapted to transmit the packets over the network by tunneling through the network, and the primary and backup virtual bridges are arranged to transmit the packets using a virtual private LAN service (VPLS). In a preferred embodiment, the primary and backup virtual bridges are adapted to serve as provider edge (PE) devices, and to transmit the packets over pseudo-wires (PWs) connecting to the edge devices, wherein the PWs include tunnels selected from the group of tunnels consisting of multi-protocol label-switched (MPLS) tunnels, Generic Routing Encapsulation (GRE) tunnels, and Layer Two Tunneling Protocol (L2TP) tunnels.

Typically, the primary virtual connections define a respective primary topology image for each of the primary virtual bridges, and each of the backup virtual bridges is paired with a corresponding one of the primary virtual bridges and is connected by secondary virtual connections to the other primary virtual bridges so as to define a respective secondary topology image that is substantially identical to the respective primary topology image of the corresponding one of the primary virtual bridges. Preferably, each of the edge devices is connected by point-to-point connections both to a respective one of the backup virtual bridges and to the corresponding one of the primary virtual bridges with which the respective one of the backup virtual bridges is paired. The edge devices may be connected to the respective one of the backup virtual bridges in a first star topology and to the corresponding one of the primary virtual bridges in a second star topology. Alternatively, the edge devices are connected to the respective one of the backup virtual bridges and to the corresponding one of the primary virtual bridges in a full mesh topology.

In a preferred embodiment, the primary virtual connections define a first full mesh of the primary virtual bridges, and each of the backup virtual bridges is connected by the secondary virtual connections to both the primary virtual bridges and to the other backup virtual bridges so as to define a second full mesh of the backup virtual bridges and a third full mesh between each one of the backup virtual bridges and the primary virtual bridges, except for the corresponding one of the primary virtual bridges with which the backup virtual bridge is paired.

Typically, each of the primary and backup virtual bridges is adapted to maintain a respective media access control (MAC) table, and to forward the data packets in accordance with entries in the MAC table, and each of the secondary virtual bridges is adapted to periodically synchronize its MAC table with the MAC table of the corresponding one of the primary virtual bridges with which it is paired.

In a preferred embodiment, each of the backup virtual bridges is connected by secondary virtual connections to both the primary virtual bridges and to the other backup virtual bridges, so that the primary and second virtual connections define a full mesh of all the primary and secondary virtual bridges.

Preferably, each of the edge devices is connected to a respective one of the primary virtual bridges and to a respective one of the backup virtual bridges, so that upon detecting the failure of the respective one of the primary virtual bridges, the edge devices communicate with the network through the backup virtual bridge instead of the respective one of the primary virtual bridges. Further preferably, the primary virtual bridges are adapted, upon receiving packets sent by the edge devices through the backup virtual bridge, to communicate with the backup virtual bridge instead of the one of the primary virtual bridges in which the failure occurred.

In a preferred embodiment, the edge devices are adapted to send periodic messages to the primary virtual bridges in accordance with a predetermined signaling protocol, and to detect the failure when the one of the primary virtual bridges does not respond to the messages as expected. Preferably, the predetermined signaling protocol is selected from a group of OAM or topology discovery procedures provided by lower network protocol layers.

In another preferred embodiment, at least one of the backup virtual bridges is connected by a single secondary virtual connection to a selected one of the primary virtual bridges, such that upon the failure of the at least one of the primary virtual bridges with which the at least one of the backup virtual bridges is associated, the at least one of the backup virtual bridges transmits and receives the data packets over the network via the selected one of the primary virtual bridges over the single secondary virtual connection. Preferably, each of the primary virtual bridges is adapted to maintain a respective media access control (MAC) table, and to forward the data packets in accordance with entries in the MAC table, and wherein each of the primary virtual bridges is adapted, upon detecting the failure of the at least one of the primary virtual bridges, to update the entries in the respective MAC table that point to the at least one of the primary virtual bridges so as to point instead to the selected one of the primary virtual bridges.

There is also provided, in accordance with a preferred embodiment of the present invention, a method for data communication, including:

interconnecting a plurality of primary virtual bridges using primary virtual connections through a network;

linking the primary virtual bridges to edge devices, so as to enable the edge devices to transmit and receive data packets over the network via the primary virtual connections;

associating a backup virtual bridge with at least a first primary bridge among the plurality of the primary virtual bridges;

connecting the backup virtual bridge using at least one secondary virtual connection through the network to at least one of the primary virtual bridges other than the first primary virtual bridge; and upon a failure of the first primary virtual bridge, transmitting and receiving the data packets to and from the edge devices via the at least one secondary virtual connection using the backup virtual bridge in place of the first primary virtual bridge.

The present invention will be more fully understood from the following detailed description of the preferred embodiments thereof, taken together with the drawings in which:

DETAILED DESCRIPTION OF PREFERRED EMBODIMENTS

Figure 1:
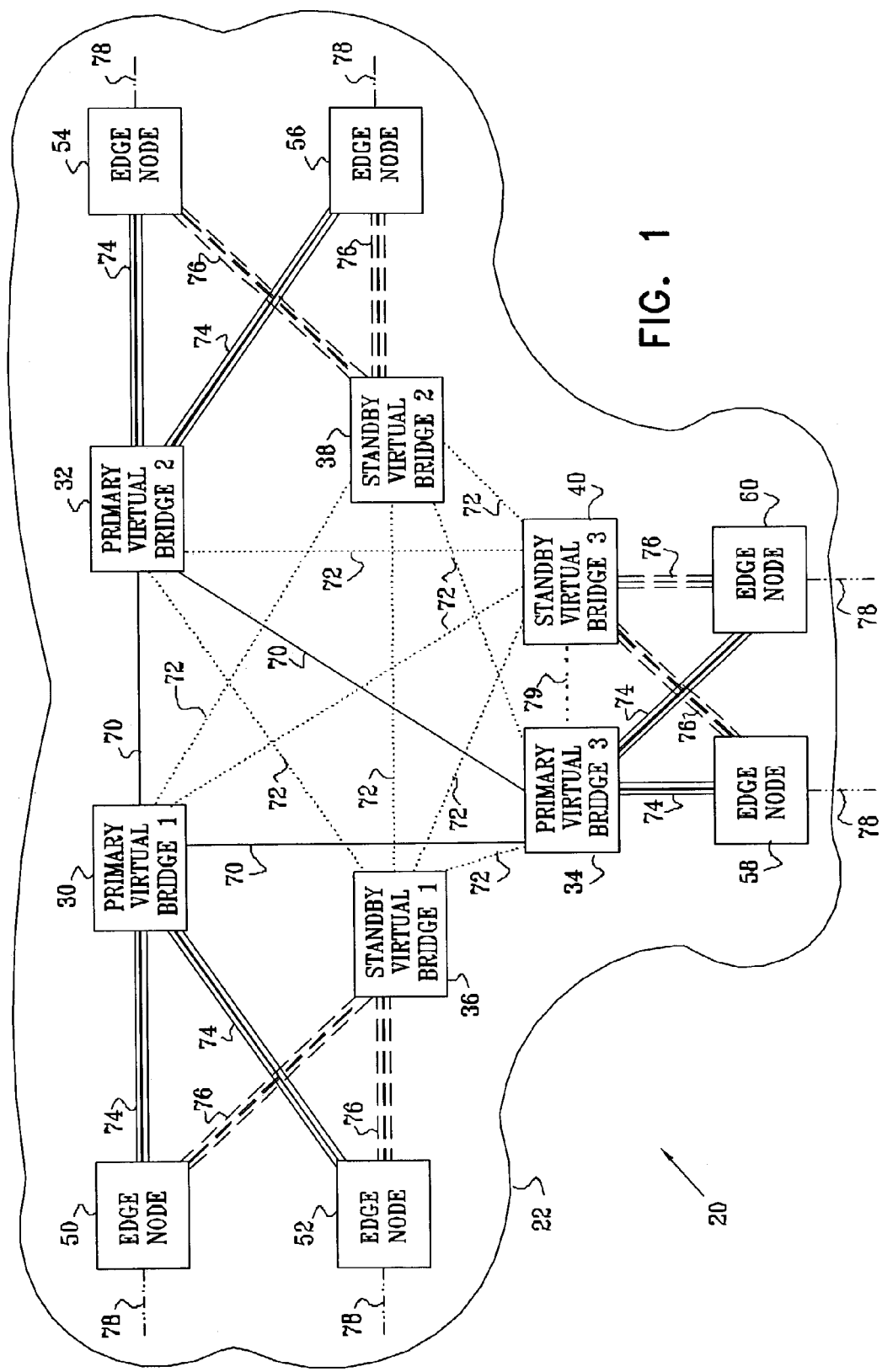
FIG. 1 is a block diagram that schematically illustrates a VPN with a protection scheme in accordance with a preferred embodiment of the present invention.

FIG. 1 is a block diagram that schematically illustrates a VPN 20 with a hierarchical VPLS topology, implementing a protection scheme in accordance with a preferred embodiment of the present invention. VPN 20 is built around a virtual private LAN service (VPLS), operating within a network 22, typically an IP or MPLS network. The VPLS is based on virtual bridges 30, 32, 34, 36, 38, and 40, or VPLS-capable PEs, which are connected by PWs 70, 72, 74 and 76 through network 22. Although for clarity of illustration, network 22 includes only a small number of PEs and represents only a single VPLS instance, the principles embodied in this network may be extended in a straightforward manner to larger networks and to multiple VPLS instances.

Three primary virtual bridges 30, 32 and 34, referred to as primary core nodes, are connected with each other in a full mesh with PW connections 70. Typically, the PW connections comprise MPLS tunnels, but they may alternatively comprise virtual connections of other types, such as GRE or L2TP tunnels. Each of the primary core nodes 30, 32 and 34, is paired with a corresponding backup virtual bridge, referred to as a standby core node, 36, 38 and 40, respectively. The standby core nodes are connected in the network by redundant backup connections 72. Each standby core node has a topology identical to its corresponding primary core node. For example, standby core node 36 has the same topology image as primary core node 30. Each of the primary and standby core nodes is connected to all the other core nodes in the network except for the standby or primary core node with which it is paired. An optional connection 79 between a primary core node and its corresponding standby core node may also be included, as described hereinbelow.

The core nodes are configured to support a split horizon model. Connections 74 and 76 are made between the core nodes and edge nodes 50, 52, 54, 56, 58 and 60, as shown in FIG. 1. For the sake of simplicity in this figure, only two edge nodes are shown to be connected to each core node. Edge nodes are in turn connected to user terminals via physical interfaces 78, which are typically Ethernet interfaces, but may alternatively be interfaces of other types, such as frame relay or ATM circuits. The VPLS and LAN topologies shown in FIG. 1 are chosen by way of example, and the principles of the present invention may be applied, mutatis mutandis, to alternative VPLS and LAN topologies, as well.

If a primary core node fails, all connections 70, 74 and 72 to the failed primary core node are no longer used. Backup connections 72 and 76 to the corresponding standby core node are used instead. For example, if primary core node 30 fails, edge nodes 50 and 52, which prior to the failure had been communicating through PW connections 74 with primary core node 30, begin instead to communicate with standby core node 36 through PW connections 76. The other core nodes (typically primary core nodes 32 and 34, but possibly standby core nodes 38 and 40 if there were other primary core node failures) begin to use backup PW connections 72 to communicate with standby core node 36.

Since the topological position of standby core node 36 is identical to that of primary core node 30, the remaining nodes in the network may continue to use the PW associations in their MAC tables that they learned before the failure, except that the tables now point to the backup connections instead of the failed primary connections. The other nodes simply redirect all packets that were supposed to be sent to the failed primary core node 30 to the standby core node 36 that protects it. Detection of and response to core node failure proceeds as follows:

Core node failures are initially detected by edge nodes, using either existing signaling protocols (such as "hello" messages provided by the Label Distribution Protocol—LDP), or using special "ping" operations or OAM (operations, administration, and management) connectivity verification if such a signaling protocol is not available or if faster response is required. Some special network topologies, such as Resilient Packet Rings-(RPR), have built-in topology discovery protocols, enabling very fast detection of node failures.

Upon noticing the failure of a primary core node, all the edge nodes that are connected through point-to-point PWs to the failed primary core node begin communicating through the corresponding standby core node. The standby core node, which is "always on," then begins relaying the traffic it receives from the edge nodes. Other core nodes in the network, upon receiving this traffic from the standby core node, stop communicating through the failed primary core node and being communicating instead through the corresponding standby core node. Note that this protection scheme does not rely on any special communication protocol between a primary core node and its corresponding standby core node. If a suitable signaling protocol is available, however, between the primary and standby core nodes (like the LDP "hello" or "ping" methods noted above), faster recovery of the network may be possible.

For example, if primary core node 30 fails, edge nodes 50 and 52 detect this failure by one of the methods described above. Edge nodes 50 and 52 then start directing traffic through standby core node 36. Standby core node 36 relays the traffic to other core nodes in the network. Upon receiving this traffic, the other core nodes in the network begin redirecting traffic formerly directed to primary core node 30, to flow through standby core node 36 instead.

A simple communications protocol for synchronizing MAC table databases between each pair of primary and standby core nodes can be invoked regularly to update the standby core node with the current MAC forwarding table stored in the corresponding primary core node. In this way, if a primary core node fails, the MAC table database of the corresponding standby core node is closely synchronized with the MAC table database of the failed node, and flooding caused by unknown MAC addresses is limited to the MAC addresses learned by the failed node since the last synchronization.

Networks designed in accordance with the present invention can handle certain multiple core node failures, on the condition that at least one node from each pair of primary and standby core nodes does not fail. For example, if primary core node 30 fails, edge node 50 can stop communicating with core node 30 through point-to-point PW connection 74, and instead begin communicating with standby core node 36 through backup point-to-point PW connection 76. If primary core node 34 now also fails, the remaining active core nodes, including standby core node 36, will switch to communicating through PW 72 with standby core node 40. In this situation edge node 50 can still communicate with edge node 58 through the backup connections and nodes.

Alternatively, instead of a one-to-one pairing of primary and standby core nodes, a single standby core node can be assigned to protect multiple primary core nodes, thus reducing the number of core nodes and the number of bi-directional connections in the core side of the network. This approach may be desirable in large networks, where the number of connections may be high. For example, in the absence of standby core node 36, node 40 may be used to protect against failure of primary core node 30, as well as primary core node 34. In this case, edge nodes 50 and 52 are connected by backup connections 76 to node 40. Upon detecting a failure of node 30, nodes 32 and 34 send all packets destined for node 30, to node 40, instead. This change in topology, however, may require either more complicated MAC database coordination between the core nodes, or MAC table clearing after a failure occurs, which may cause packet flooding until the MAC learning database is re-stabilized.

After failure, if a primary core node becomes active again, a number of methods may be used for restoring traffic to it if desired. For example, the standby cores node may use a standard or dedicated signaling protocol to detect that the primary core node has again become active. In this case, the corresponding standby core node may issue a command to all the edge nodes that have point-to-point PW connections with the primary core node, instructing them to revert to using the connections with the primary core node. This approach has the benefit of making possible a synchronized topology change, avoiding a situation in which some edge nodes direct traffic through the primary core node, while other edge nodes direct traffic through the corresponding standby core node.

An alternative method of restoration of traffic to a primary core node is as follows: Once the primary core node becomes active again, the signaling of network connections between each edge node and the primary core node is re-established. Upon noticing this signaling, each edge node can begin to use its connection to the primary core node instead of the connection to the standby core node. In other words, restoration of traffic to the primary core node is carried out by a similar mechanism to that used to divert the traffic to the standby core node when the primary core node fails. In this case, however, topology recovery may be not synchronized over the whole network, so that some core nodes may continue sending traffic through the standby node for a while. The edge nodes should be therefore capable of receiving packets simultaneously from both the standby and the primary core nodes, while sending upstream packets from users to only one of these core nodes.

To protect against a single connection failure between an edge node and a core node, it is useful to add an additional point-to-point connection 79, preferably a PW connection, between each primary core node and its corresponding standby core node. These additional connections can be used to bridge between different edge nodes connected by point-to-point PW connections to the same primary and standby core nodes, as follows:

If a connection between an edge node and a primary core node fails, the edge node will start to use the corresponding standby core node, even if the primary core node itself has not failed. Thus, it may occur that some edge nodes continue to communicate with the primary core node while other edge nodes communicate with the corresponding standby core node. Layer 2 connectivity is still maintained between all the edge nodes, however, through the use of additional connection 79 between the primary and standby core nodes. If such an additional connection is used, the corresponding standby core node should typically not send traffic toward the full mesh of connections 72 unless the primary core node itself has failed.

Figure 2:
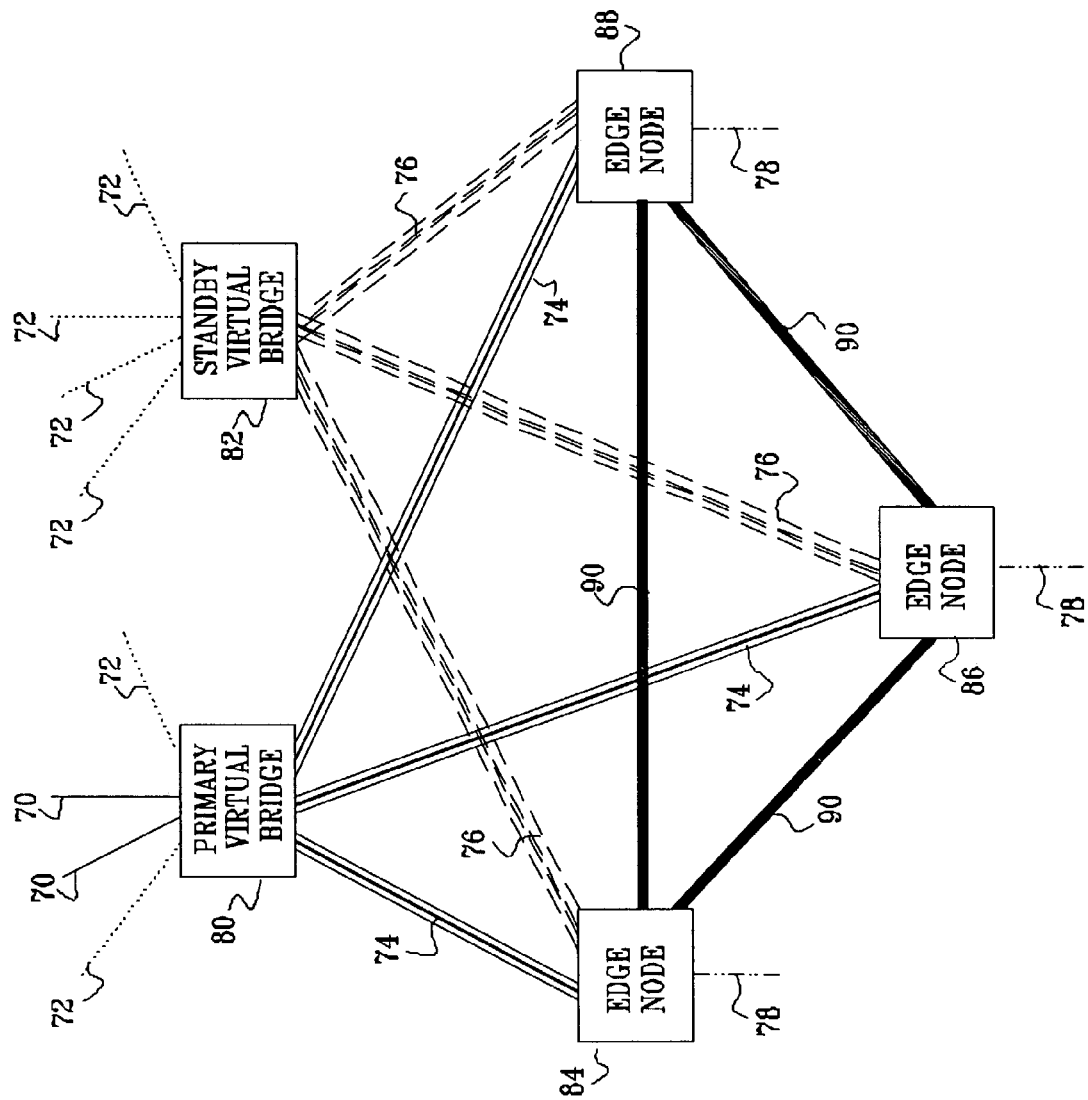
FIG. 2 is a block diagram that schematically illustrates a detail of a VPN with a protection scheme in accordance with an alternative embodiment of the present invention.

FIG. 2 is a block diagram that schematically shows a detail of VPN 20, illustrating an alternative configuration of the edge nodes, in accordance with a preferred embodiment of the present invention. The figure shows a pair of corresponding primary and standby core nodes 80 and 82, which are capable of split horizon operation between a core mesh of connections 70 and 72 and access mesh of connections 74 and 76. Edge nodes 84, 86 and 88 are connected to core nodes 80 and 82 by connections 74 and 76, and are capable of bridging in a full mesh topology created by additional connections 90 between all the edge nodes. Alternatively, other VPLS and LAN topologies may be used to connect the edge nodes to the core nodes, as well, as will be apparent to those skilled in the art.

As in the embodiment of FIG. 1, in normal operation, edge nodes 84, 86, and 88 communicate through connections 74 with primary core node 80, but in this case they communicate through connections 90 among themselves. If primary core node 80 fails, edge nodes 84, 86, and 88 begin communicating through backup connections 76 with the corresponding standby core node 82.

Figure 3:
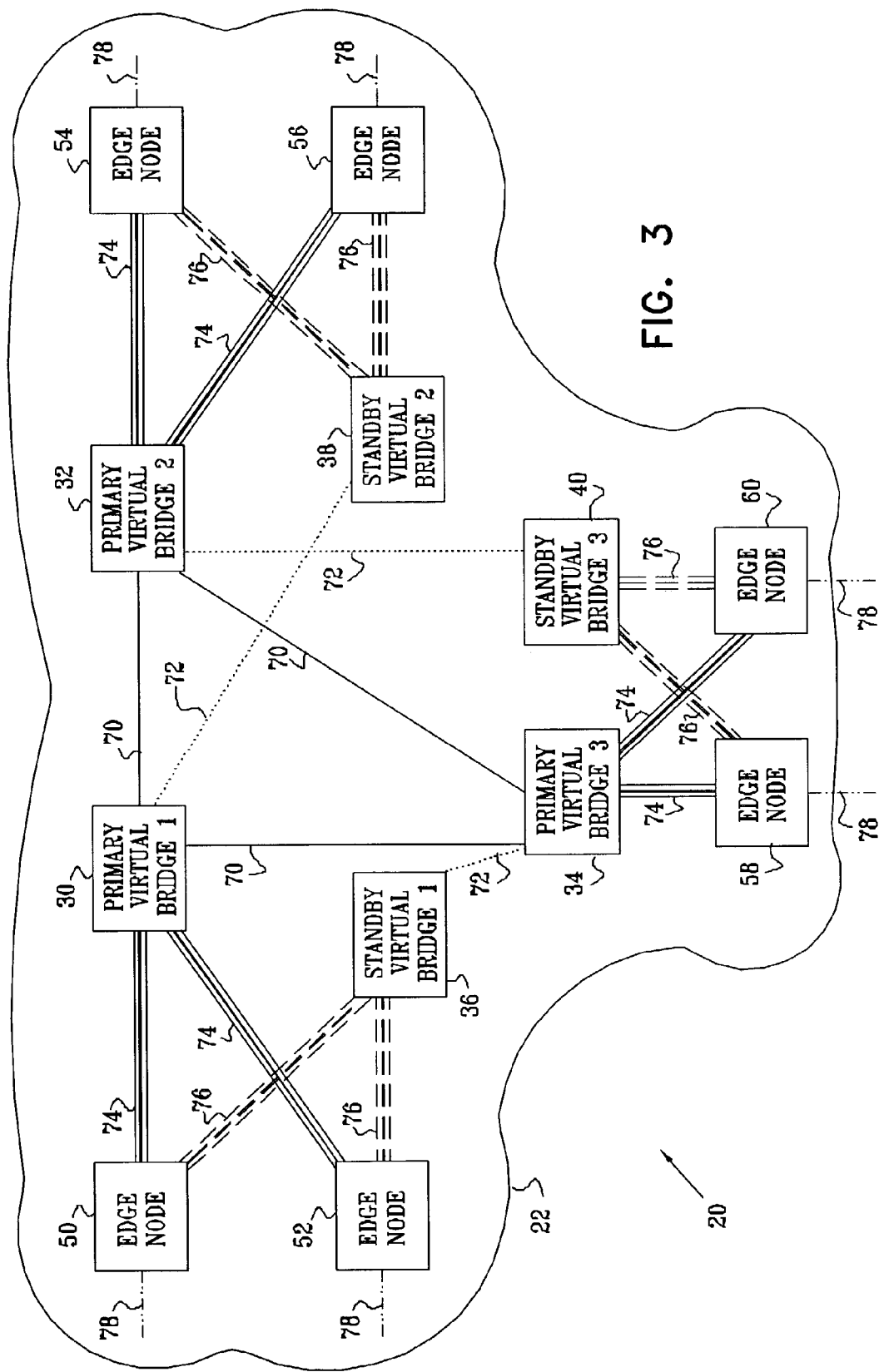
FIG. 3 is a block diagram that schematically illustrates a VPN with a protection scheme in accordance with an alternative embodiment of the present invention.

FIG. 3 is a block diagram that schematically shows VPN 20 in an alternative configuration, in accordance with a preferred embodiment of the present invention. The motivation for this configuration is to lower the number of connections in the core of network 22, at the cost of reduced immunity to multiple nodes failure. Although normal connections 70 are configured as in the preceding embodiment, each of the standby core nodes in the present embodiment is connected by only a single backup connection 72 to one of the primary core nodes. In the absence of any failure, the operation of the network is identical to that described earlier. If one of the primary core nodes fails, however, for example node 30, the spokes attached to it start to use standby core node 36, as described above. The topology image of the network is now changed, and the other core nodes must now communicate with node 36 through node 34, rather than directly.

The other primary core nodes may adjust to the change in topology in various ways. In one preferred embodiment, when the other nodes detect the failure, they simply flush the MAC table database entries associated with connections 70 that were used to communicate with node 30. In another preferred embodiment, each node knows in advance which node is on the alternative path to the standby core node corresponding to each of the primary core nodes. In this case, the other core nodes automatically re-associate the MAC addresses that were previously associated with the connection to the failed node, so that these addresses are associated instead with the connection to the node on the alternative path. (These new associations in the MAC table are in addition to the already known MAC addresses learned normally on the same connection.) Continuing with the above example, prior to the failure in node 30, node 32 will have learned to associate one set of MAC addresses with connection 70 to node 34, and to associate another set with connection 70 to node 30. Node 32 also knows (by means of configuration settings) that in case of failure in node 30, the corresponding standby node 36 is to be accessed through node 34. Therefore, when the failure occurs, node 32 simply combines the two sets of MAC addresses into one set, which is associated with the connection to node 34.

Although network 22, as described hereinabove, uses certain particular protocols for communication routing and tunneling, the principles of the present invention may similarly be applied using protocols and virtual bridges of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A data communication network, comprising:
   a plurality of primary virtual bridges, interconnected by primary virtual connections so as to transmit and receive data packets over the network to and from edge devices connected thereto; and
   a plurality of backup virtual bridges, each such backup virtual bridge being paired with a corresponding one of the primary virtual bridges and connected by secondary virtual connections to the other primary virtual bridges,
   wherein the primary virtual connections define a respective primary topology image for each of the primary virtual bridges, and wherein each of the backup virtual bridges is connected to the other primary virtual bridges by secondary virtual connections that are identical to the primary virtual connections of the corresponding one of the primary virtual bridges, thus defining a respective secondary topology image that is identical to the respective primary topology image of the corresponding one of the primary virtual bridges, and
   wherein each of the primary and backup virtual bridges is adapted to maintain a respective forwarding table, and to forward the data packets in accordance with entries in the respective forwarding table, and wherein each of the backup virtual bridges is adapted to periodically synchronize its forwarding table by copying contents of the forwarding table of the corresponding one of the primary virtual bridges with which it is paired,
   whereby upon a failure of the corresponding one of the primary virtual bridges, each of the backup virtual bridge forwards and receives the data packets over the network via the secondary virtual connections, in accordance with the synchronized forwarding table, in place of the corresponding one of the primary virtual bridges.

2. The network according to claim 1, wherein the respective forwarding table of each of the primary and backup virtual bridges comprises a respective media access control (MAC) table.

3. The network according to claim 1, wherein the primary and backup virtual bridges are adapted to transmit the packets over the network by tunneling through the network.

4. The network according to claim 3, wherein the primary and backup virtual bridges are arranged to transmit the packets using a virtual private LAN service (VPLS).

5. The network according to claim 4, wherein the primary and backup virtual bridges are adapted to serve as provider edge (PB) devices, and to transmit the packets over pseudowires (PWs) connecting to the edge devices.

6. The network according to claim 5, wherein the PWs comprise tunnels selected from the group of tunnels consisting of multi-protocol label-switched (MPLS) tunnels, Generic Routing Encapsulation (GRE) tunnels, and Layer Two Tunneling Protocol (version 3) (L2TPv3) tunnels that are adapted to carry Ethernet frames.

7. The network according to claim 1, wherein each of the edge devices is connected by point-to-point connections both to a respective one of the backup virtual bridges and to the corresponding one of the primary virtual bridges with which the respective one of the backup virtual bridges is paired.

8. The network according to claim 7, wherein the edge devices are connected to the respective one of the backup virtual bridges in a first star topology and to the corresponding one of the primary virtual bridges in a second star topology.

9. The network according to claim 7, wherein the edge devices are connected to the respective one of the backup virtual bridges and to the corresponding one of the primary virtual bridges in a full mesh topology.

10. The network according to claim 1, wherein the primary virtual connections define a first full mesh of the primary virtual bridges, and wherein each of the backup virtual bridges is connected by the secondary virtual connections to both the primary virtual bridges and to the other backup virtual bridges so as to define a second full mesh of the backup virtual bridges and a third full mesh between each one of the backup virtual bridges and the primary virtual bridges, except for the corresponding one of the primary virtual bridges with which the backup virtual bridge is paired.

11. The network according to claim 1, wherein each of the backup virtual bridges is connected by secondary virtual connections to both the primary virtual bridges and to the other backup virtual bridges, so that the primary and second virtual connections define a full mesh of all the primary and secondary virtual bridges.

12. The network according to claim 1, wherein each of the edge devices is connected to a respective one of the primary virtual bridges and to a respective one of the backup virtual bridges, so that upon detecting the failure of the respective one of the primary virtual bridges, the edge devices communicate with the network through the backup virtual bridge instead of the respective one of the primary virtual bridges.

13. The network according to claim 12, wherein the primary virtual bridges are adapted, upon receiving packets sent by the edge devices through the backup virtual bridge, to communicate with the backup virtual bridge instead of the one of the primary virtual bridges in which the failure occurred.

14. The network according to claim 12, wherein the edge devices are adapted to send periodic messages to the primary virtual bridges in accordance with a predetermined signaling protocol, and to detect the failure when the one of the primary virtual bridges does not respond to the messages as expected.

15. The network according to claim 14, wherein the predetermined signaling protocol is selected from a group of OAM or topology discovery procedures provided by lower network protocol layers.

16. A method for data communication, comprising:
interconnecting a plurality of primary virtual bridges using primary virtual connections through a network, wherein the primary virtual connections define a respective primary topology image for each of the primary virtual bridges;
linking the primary virtual bridges to edge devices, so as to enable the edge devices to transmit and receive data packets over the network via the primary virtual connections;
associating a plurality of backup virtual bridge with the plurality of the primary virtual bridges, such that each of the backup virtual bridges is paired with a corresponding one of the primary virtual bridges;
configuring secondary virtual connections between the backup virtual bridges and the primary virtual bridges such that each of the backup virtual bridges is connected to the other primary virtual bridges by secondary virtual connections that are identical to the primary virtual connections of the corresponding one of the primary virtual bridges, thus defining a respective secondary topology image that is identical to the respective primary topology image of the corresponding one of the primary virtual bridges;
maintaining a respective forwarding table in each of the primary and backup virtual bridges, wherein each of the backup virtual bridges is adapted to periodically update its forwarding table by copying contents of the forwarding table of the corresponding one of the primary virtual bridges with which it is paired; and
upon a failure of the corresponding one of the primary virtual bridges, forwarding and receiving the data packets to and from the edge devices via the secondary virtual connections using one of the backup virtual bridges, in accordance with the synchronized forwarding table.

17. The method according to claim 16, wherein the respective forwarding table of each of the primary and backup virtual bridges comprises a respective media access control (MAC) table.

18. The method according to claim 16, wherein transmitting and receiving the packets comprises transmitting and receiving the packets by tunneling through the network.

19. The method according to claim 18, wherein transmitting and receiving the packets comprises transmitting and receiving the packets using a virtual private LAN service (VPLS).

20. The method according to claim 19, wherein the primary and backup virtual bridges are adapted to serve as provider edge (PB) devices, and wherein transmitting and receiving the packets comprises transmitting and receiving the packets over pseudo-wires (PWs) connecting to the PB devices.

21. The method according to claim 20, wherein the PWs comprise tunnels selected from the group of tunnels consisting of multi-protocol label-switched (MPLS) tunnels, Generic Routing Encapsulation (GRE) tunnels, and Layer Two Tunneling Protocol (version 3) (L2TPv3) tunnels that are adapted to carry Ethernet frames.

22. The method according to claim 16, wherein each of the edge devices is connected by point-to-point connections both to a respective one of the backup virtual bridges and to the corresponding one of the primary virtual bridges with which the respective one of the backup virtual bridges is paired.

23. The method according to claim 22, wherein the edge devices are connected to the respective one of the backup virtual bridges in a first star topology and to the corresponding one of the primary virtual bridges in a second star topology.

24. The method according to claim 22, wherein the edge devices are connected to the respective one of the backup virtual bridges and to the corresponding one of the primary virtual bridges in a full mesh topology.

25. The method according to claim 16, wherein interconnecting the plurality of primary virtual bridges comprises arranging the primary virtual connections to define a first full mesh of the primary virtual bridges, and wherein connecting the backup virtual bridge comprises arranging the secondary virtual connections to define a second full mesh of the backup virtual bridges and a third full mesh between each one of the backup virtual bridges and the primary virtual bridges, except for the corresponding one of the primary virtual bridges with which the backup virtual bridge is paired.

26. The method according to claim 16, wherein interconnecting the plurality of primary virtual bridges and connecting the backup virtual bridge comprise configuring the first and second virtual connections so as to define a full mesh of all the primary and secondary virtual bridges.

27. The method according to claim 16, wherein forwarding and receiving the data packets to and from the edge devices comprises detecting the failure of the first primary virtual bridge at one or more of the edge devices, and initiating communication from the one or more of the edge devices to the backup virtual bridge in response to detecting the failure.

28. The method according to claim 27, wherein forwarding and receiving the data packets to and from the edge devices further comprises receiving the data packets sent by the edge devices through the backup virtual bridge at the primary virtual bridges other than the first primary virtual bridge, and in response to receiving the data packets, diverting communication traffic from the other primary virtual bridges to the backup virtual bridge.

29. The method according to claim 27, wherein detecting the failure comprises sending periodic messages to the primary virtual bridges in accordance with a predetermined signaling protocol, and detecting the failure when the one of the primary virtual bridges does not respond to the messages as expected.

30. The method according to claim 29, wherein the predetermined signaling protocol is selected from a group of OAM or topology discovery procedures provided by lower network protocol layers.

* * * * *